Patented Sept. 1, 1931

1,820,933

UNITED STATES PATENT OFFICE

FRIEDRICH A BRASSARD, OF BAD GODESBERG, GERMANY, ASSIGNOR TO THEODORE HEMEKE, AS TRUSTEE, OF HICKSVILLE, LONG ISLAND, NEW YORK

WALL BOARD AND THE LIKE FOR COVERING WALLS

No Drawing. Application filed January 21, 1929, Serial No. 334,119, and in Germany September 9, 1928.

This invention relates to improvements in wallboards and the like for covering walls, and for use in the construction of partitions and ceilings; especially wallboards of this type which can be produced by mixing and hardening the materials composing them.

An object of this invention is to provide a plate or board consisting primarily of asbestos and cement, which is especially adapted for wall covering purposes.

Another object of the invention is to provide a wallboard which can be given a durable and attractive coating of any selected color.

A further object of the invention is to provide a wallboard which is of low cost and great strength and which will have a superior finished appearance.

The plates or boards produced according to this invention are provided with a coating which consists of cellulose-ester lacquer. This coating may contain an addition consisting of resins, oils, etc. and be colored as desired.

Wallboards according to this invention possess many advantages over previous boards made for the same purpose. Plates, boards and the like for covering walls have been manufactured of clay or porcelain-like material which was either colored throughout or in the glazing process. The production of such plates is difficult and expensive, especially where repeated firing is necessary. This is particularly true for bright colors, as these can only be obtained by glazing; and then only to a limited extent. Ordinary painting with lacquer or enamel has also not proved satisfactory, for plates so treated do not stand transportation very well and are affected by mortar when being put into place.

Less costly than the clay and porcelain plates or boards produced by firing are plates or boards consisting of cement to which mineral fibrous material, such as asbestos is added where no firing is required. But these plates also possess essential disadvantages with regard to imparting colors to them. They can, however, be colored throughout their mass, but only in a few dull colors, the production of which requires expensive coloring material. It is not possible when ordinary lacquer or enamel is employed to cover such plates cheaply and get all tints starting from dull up to the bright and glossy shades, either in one color or in pattern; for the reason that the substances used with the enamel and ordinary lacquer do not stick to the cement proper, or cannot withstand the strain of transportation or the handling.

On the other hand, cellulose-ester lacquers, for instance cellulose-nitrate lacquers, alone or in connection with resins, oils, etc., produce firmly adhering coatings which are very resistant to hot and cold water, soap, soda and acid solutions and other cleaning and disinfecting substances, etc., as well as weatherproof. These coatings also possess great strength and durability against mechanical stress, and become hard. The coatings can be colored in any manner with hues in all variations, from dull to highly finished glossy effects.

For the reason that the customary oil and resinous enamel colors do not adhere to cement and would soon be destroyed by the alkaline action thereof, the extraordinary adhesiveness of the cellulose-ester lacquer to the mass of cement and asbestos and the durability of the coating on the wallboards was quite unexpected when its discovery was made.

With this invention, one can produce at relatively small expense durable plates or wallboards, strong enough to resist breaking and with fine colored coatings, dull, or with a gloss. They are used for hospitals, baths, etc., and are equal in all respects to the expensive glazed porcelain plates heretofore used.

Sometimes slate in the form and size made necessary can be mixed with the asbestos and cement.

As a further improvement the wallboard of asbestos cement and slate (if present) may be made by adding colored bodies to give the appearance of marble or granite.

In place of the colored bodies, or in addition thereto, other materials may be used which are suitable for obtaining the marble-like appearance. Such other materials are for instance mother of pearl chips, or scales of fish. The colorless or colored cellulose-ester-lacquer then serves not only to provide the rough surface of the board with a weather-proof, clean and sanitary coating but also to produce the effect of marble or granite that has been polished.

A special effect can be obtained in case the mineral fibrous material for instance, asbestos, in the board is tinted by suitable coloring material, especially tar colors.

I claim:

1. The herein described wallboard comprising a composition body containing therein colored particles in simulation of marble, and a protective plain coating, unglazed, unpainted and non-enameled, covering said body and consisting of a cellulose-ester softening agent, resistant to hot and cold water and waterproof.

2. The herein described wallboard comprising a body consisting of cement and fibre, mother of pearl or fish scales incorporated therewith, and a plain protective coating unglazed, unpainted and non-enameled, covering the entire surface of said body and consisting of a cellulose-ester softening agent resistant to hot and cold water and water-proof.

3. The herein described wallboard comprising a composition body including a cement base and fibre, colored particles incorporated with the base and fibre whereby they are given a marble-like appearance, and non-metallic water-proof protective coating, unglazed, unpainted and non-enameled and resistant to hot and cold water, covering the entire surface of the body and adapted to complete the marble-like effect.

In testimony that I claim the foregoing as my invention, I have signed my named hereto.

FRIEDRICH A BRASSARD.